United States Patent [19]

Korn

[11] Patent Number: 4,674,969
[45] Date of Patent: Jun. 23, 1987

[54] APPARATUS FOR MAKING PLASTIC TUBES

[75] Inventor: Günther Korn, Königsberg, Fed. Rep. of Germany

[73] Assignee: Frankische Rohrwerke Gebr. Kirchner GmbH & Co., Fed. Rep. of Germany

[21] Appl. No.: 741,668

[22] PCT Filed: Oct. 3, 1984

[86] PCT No.: PCT/DE84/00206
§ 371 Date: May 29, 1985
§ 102(e) Date: May 29, 1985

[87] PCT Pub. No.: WO85/01471
PCT Pub. Date: Apr. 11, 1985

[51] Int. Cl.⁴ .............................................. B29C 49/38
[52] U.S. Cl. .................................. 425/325; 425/327; 425/539; 425/540; 425/392
[58] Field of Search ............... 425/369, 370, 320, 321, 425/392, 393, 539, 116, 324, 325, 327, 345, 540, 394; 264/167

[56] References Cited

U.S. PATENT DOCUMENTS

| | | | |
|---|---|---|---|
| 2,281,860 | 5/1942 | Renault | 425/371 |
| 2,613,619 | 10/1952 | Willomitzer | 425/371 |
| 2,866,230 | 12/1958 | Holte | 425/370 |
| 3,243,850 | 4/1966 | Zieg | 425/370 |
| 3,286,430 | 10/1966 | Antrobus | 425/370 |
| 3,349,156 | 10/1967 | Zieg | 425/370 |
| 3,746,487 | 7/1973 | Andrews | 425/371 |
| 3,751,541 | 8/1973 | Hegler | 425/370 |
| 3,776,679 | 12/1973 | Hegler | 425/539 |
| 3,981,663 | 9/1976 | Lupke | 425/539 |
| 4,003,685 | 1/1977 | Maroschak | 425/539 |
| 4,072,453 | 2/1978 | Oltmanns et al. | 425/370 |
| 4,157,235 | 6/1979 | Lagabe et al. | 264/167 |
| 4,212,618 | 7/1980 | Hegler et al. | 425/396 |

FOREIGN PATENT DOCUMENTS 0048133 3/1982 European Pat. Off. .
1218574 12/1966 Fed. Rep. of Germany .
3118932 12/1982 Fed. Rep. of Germany .

Primary Examiner—Willard E. Hoag
Attorney, Agent, or Firm—Armstrong, Nikaido, Marmelstein & Kubovcik

[57] ABSTRACT

Apparatus for extruding and reshaping plastic tubes including cooperating circulating molds attached to continuous belts or chains. The molds circuits at generally constant level. A wheeled carriage is provided to support the molds and to permit axial adjustment of the molds relative the extruder nozzle. Means also is provided for vertical adjustment of mold support means.

6 Claims, 3 Drawing Figures

APPARATUS FOR MAKING PLASTIC TUBES

BACKGROUND OF THE INVENTION

The invention relates to an apparatus for making plastic tubes according to the preamble of claim 1.

In an apparatus for making in particular transversely grooved plastic tubes two sequences of die halves each circulating in an endless track are provided. The tracks border each other along a working section in such a manner that opposite die halves of the two tracks each form a continuous hollow mold for such a tube. Into this continuous hollow mold the plastic tube is extruded and by establishing a pressure gradient between the interior of the tube and the outside thereof applied shapingly to the die walls. This tube moves jointly with the two die sequences until it has adequately cooled and solidified and the two die sequences move apart again on passing through their endless track.

To enable tubes to be made with such an apparatus which at selective different intervals have sections of different shaping, for example end sleeves, according to the known apparatus forming the preamble (EP-A1 0 048 113) the die halves are provided with a plurality of different molding or forming passages. Said die halves are displaceable transversely of the longitudinal direction of a chain carrying them. Control slides for the displacement position circulate in guide rails which are provided with switching points. It is thus possible with the known apparatus by actuating the complicated points arrangement in the running extrusion operation to change from one for m of the tube being made to another. It is thus possible with the known apparatus to make tubes having differently shaped sections continuously by extrusion.

Although the known apparatus is only intended for making tubes for example with end sleeves it is fundamentally also possible to make endless tubes of various types with this apparatus. For said endless tubes several forms are available so that when changing production from one tube form to another it is not necessary to interchange all the die halves, a changeover operation being sufficient.

However, the production changeover takes place relatively rarely so that the time gained with the known apparatus is not in proportion economically to the considerable investment costs and the wear liability of the very complicated apparatus forming the preamble. In addition, because of their high thermal and mechanical stressing the great number of switching members necessary are liable to cause trouble.

SUMMARY OF THE INVENTION

In contrast, the invention provides an apparatus which permits production changeover from one form of an endless tube to another, in particular from one cross-section to a larger or smaller one, with only a small constructional expenditure without having to replace the die halves.

This result is achieved with the subject of claim 1.

With the invention, on a changeover of the apparatus the individual separate die halves are not displaced in their relative position to a chain carrying them which circulates fixed in location with respect to the extrusion nozzle, as hitherto, but instead the guide means with frame and drive may assume relatively to the extrusion nozzle different positions such that in each case the desired mold or form passage of the die halves forming a plurality of form passages lies in front of the extrusion mold. This apparently complicated approach is surprisingly simpler than the construction according to the prior art.

It is known per se (DE-OS No. 3,118,932) to provide on the machine table carrying the guide means for the die halves a fine adjustment means for setting the position of the form channel relatively to the extrusion nozzle but this step is only for exact adjustment of the particular die halves used to the extrusion nozzle because these die halves each provided with only one form passage are in turn replaceable and when the die halves are replaced in some cases a fine adjustment of their position relatively to the extrusion nozzle appears advantageous.

Thus, the apparatus according to the invention permits rapid changeover of the production from making an endless tube having one form (wall profiling, diameter and the like) to an endless tube having a different form without having to appreciably exceed the constructional expenditure of the apparatus suitable only for production of a single form of an endless tube. Conversely, the production of an apparatus which according to the invention has die halves with for example three mold cavities is substantially cheaper than the production of the latter known apparatus having three sets of different die halves.

The guide means adjustable in their entirety with respect to the extrusion nozzle are for example chains, passages and the like and have a drive with guide wheels, etc.

Whereas in the apparatus forming the preamble the two die halve sequences circulate in a vertical plane to minimize the frictional forces on adjustment of the die halves exerted by the latter on a respective associated dovetail guide, the apparatus according to the invention is not subjected to such restrictions because the frame carrying the guide means can readily be moved into practically any position by a suitable adjusting means with low mechanical expenditure.

It is fundamentally possible to make said frame freely adjustable so that in the production changeover from one tube form to another in a manner known per se by fine adjustment the optimum position association of form passage and extrusion nozzle can be found and set. According to a further development of the invention the changeover of the production operation is however still further facilitated and simplified in that with each of the form passages formed by the die sequences an end stop is associated which is attached to the frame or the stationary subframe carrying the latter and makes it possible for each of the positions of the frame to be assumed simply and without additional adjustment work. Thus, not only is the changeover of the production operation particularly rapid but it can also be easily carried out by unskilled personnel.

It is nevertheless as before still advantageous to attach the multiple die halves according to the invention so that they themselves are replaceable so as to still further increase the choice of tube forms which can be made by a machine. The replacement dies can have the same or a different number of mold or form passages compared with the originally provided die halves.

In the case of replaceable die halves it is further advantageous for the end stops in turn to be adjustable so that adaptation to the particular die halves used is possible.

The number of form passages in the die sequences is selectable within wide limits, particularly when as guide means a guide channel is used which is able to cleanly guide even very high die halves. In view of the expenditure necessary for cooling the die half, die halves having two to five form passages are particularly preferable.

In the second known apparatus referred to the adjustment of the frame carrying the guide means is by a drive by means of a fittable hexagonal spanner. In contrast, according to a further development of the invention a power drive is provided for adjusting the positions of the guide means or frame, whereby the changeover operation is simplified and expedited. Said power drive may for example be by a pneumatic or hydraulic lifting cylinder which engages on the frame guided in the adjustment direction. Alternatively, as in the known apparatus it is possible to mount the frame on a plurality, preferably four, threaded spindles and to couple the latter for common rotation. It is also possible to use a single motor-driven lifting spindle which adjusts a lever gearing articulated to the frame.

The end fittings may be replaced by readable markings or a suitable coding in a drive control device. However, the end fittings are preferably coupled to the power drive in such a manner that they automatically switch off the power drive when a desired position is reached. Particularly suitable are microswitches which on passing a stop relatively movable with respect to them stop the lifting motor.

DESCRIPTION OF THE DRAWINGS

The subject of the invention will be explained in detail hereinafter with the aid of the attached schematic drawings, wherein.

DETAILED DESCRIPTION

Figure 1:
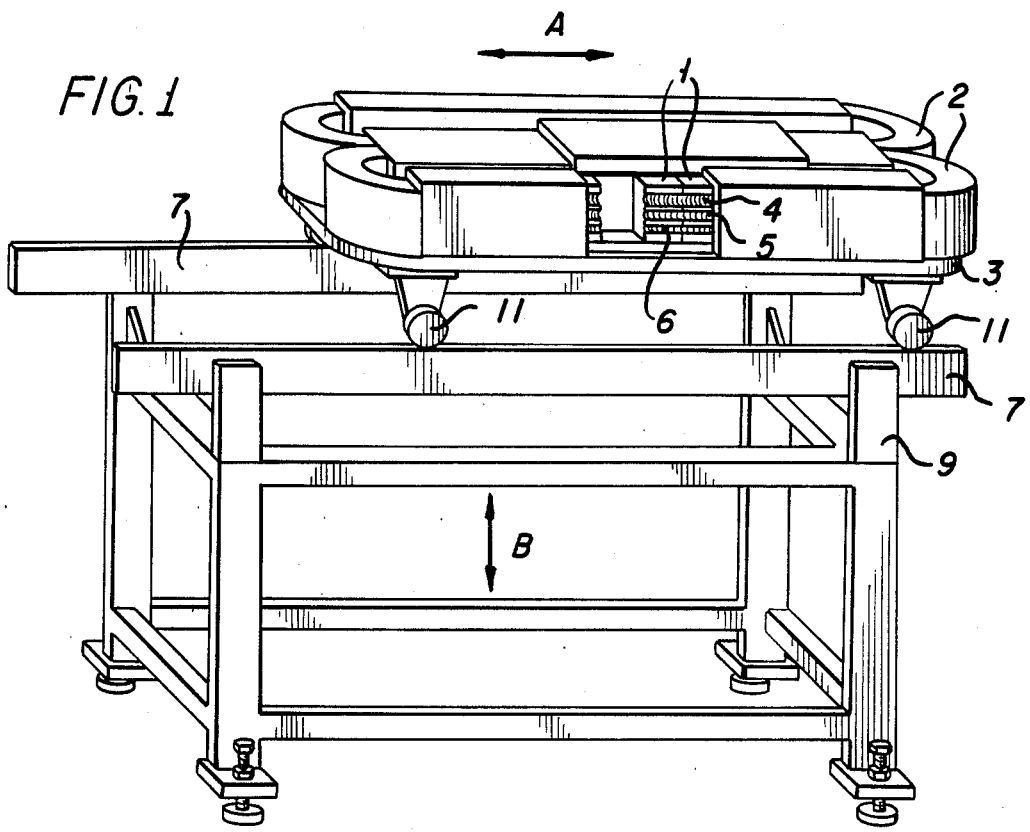
FIG. 1 is a very diagrammatic perspective view of the apparatus according to the invention.

FIG. 1 shows diagrammatically the overall arrangement of an embodiment of the apparatus according to the invention.

Figure 3:
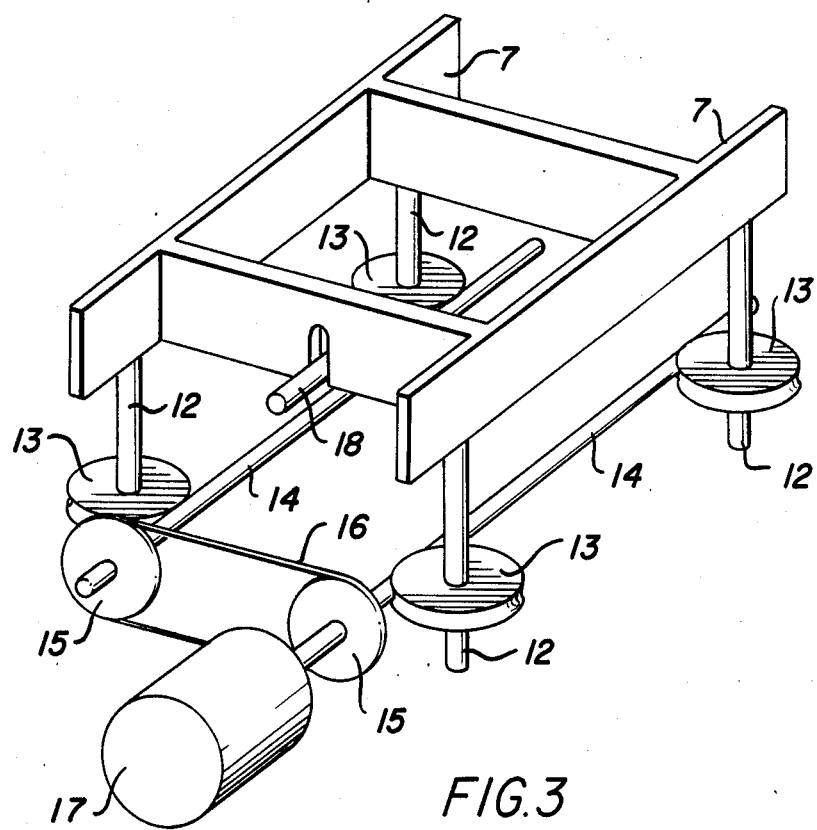
FIG. 3 is the schematic illustration of a lifting drive for the embodiment of the apparatus according to the invention shown in FIG. 1.

A subframe 7 rests on a fixed based 9 displaceable perpendicularly to the circulating plane of the die halves, i.e. in this case in the vertical direction along the double arrow B; of said subframe 7, for simplicity only two beams each forming a longitudinal rail are shown which are connected together by cross members (shown in FIG. 3).

This subframe is vertically reciprocated by means of a drive which is not shown and for example known and can be locked in preselected levels or positions.

On the upper side of the beams a likewise substantially horizontally directed frame 3 runs which bears on the beams via rollers 11. This arrangement of the die means travelling in the extrusion direction is known and generally usual and will therefore not be explained in detail. On the upper side of said frame 3 two elongated oval guide passages 2 rest in which in each case a die sequence of die halves 1 circulates in usual manner. Each of said die halves 1 comprises a plurality of adjacent different and preferably differently sized form or mold half passages 4, 5 and 6.

Figure 2:
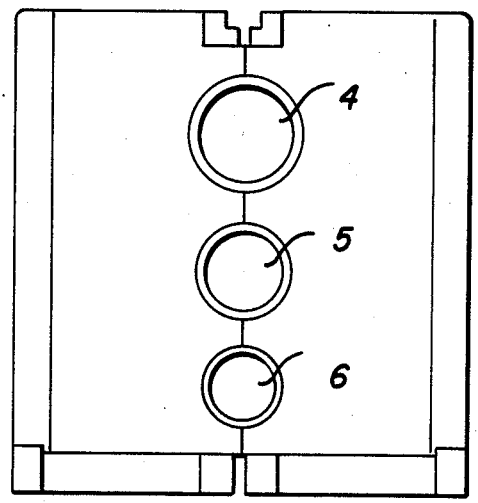
FIG. 2 shows two associated die halves, seen in the extrusion direction.

A drive (not shown) causes the die halves 1 to circulate oppositely in the two adjacent guide passages 2, the individual die halves 1 being placed against each other by the guide passages 2 in the centre region of the frame to form a plurality of cavities as apparent from FIG. 2.

At the entry side of the working section formed by the engaging die halves 1 from an extruder head (not shown) a still deformable undersized tube is introduced into in each case a continuous form passage formed along said section and at the end of said passage emerges solidified and shaped corresponding to the wall configuration of the passage.

In a position stationary with respect to the base 9 there is the extruder head (not shown) with an extruder nozzle which ejects a still deformable flexible tube coaxially to the moving form passage disposed in front thereof and introduces said tube into said passage.

The displacement of the frame running on the rollers 11 along the beams 7 in the direction of the double arrow A facilitates the introduction of the preextruded still deformable tube into one of the form passages at the start of the production.

Furthermore, the extruder head is always readily accessible by pushing away the frame 3.

In the operation changeover the extrusion is stopped in the usual manner and the subframe 7 and thus the frame 3 and the die halves 1 raised or lowered in the direction of the arrow B until the form passage corresponding to the product now desired lies coaxially with the extruder head in front of the latter. The extruder is then started in the usual manner.

In FIG. 3 the subframe 7 is shown in detail; as apparent, the two longitudinal beams are connected together by cross-members.

At the lower side of the frame 7 four vertically extending threaded spindles 12 are secured onto each of which a nut 13 is screwed. The outer edge of the respective nut 13 is constructed as worm wheel and in each case two hollow wheels 13 aligned with each other in the longitudinal direction of the apparatus are connected together by a common worm shaft 14.

At one end the two worm shafts 14 are extended and each provided with a sprocket 15 which are connected via a chain 16.

One of the worm spindles 14 is extended beyond the sprocket 15 and carries a drive motor 17 which in turn is fixedly mounted on the base 9.

The gear and thread pairings at the two sides of the subframe 7 are adapted to each other in such a manner that on rotation of the motor the subframe 7 is uniformly raised or lowered, i.e. always in a horizontal position.

This can be achieved in that for example the threaded spindle 12 and the rotating nuts lifting them are provided on one side of the machine with a right-hand thread and on the other with a left-hand thread. It is also for example possible to use four spindles with the same thread and instead to make one of the two worm shafts 14 right-handed and the other left-handed.

The nuts or worm wheels 13 are in turn mounted on the base 9 in such a manner that they cannot yield upwardly or downwardly.

Mounted on a transverse member of the subframe 7 is a projecting stop 18 which is adapted to come into engagement with microswitches (not shown) opposite thereto and disposed above each other on the base 9 in such a manner that the drive motor 17 connected via the microswitch comes to a standstill every time the stop 18 comes into engagement with one of the microswitches.

The position of the microswitches can be varied independently of each other in the vertical direction so that by adjusting the corresponding microswitch the travel height of each form passage 4, 5, 6 can be set exactly to the level of the extruder head.

What is claimed is:

1. An apparatus for transversely profiling a wall of plastic tubes which are being extruded from an extrusion nozzle comprising:

frame means;

a drive means mounted on said frame means;

a pressure gradient means mounted on said frame means;

at least two pairs of cooled die halves mounted on said frame means, said two pairs of cooled die halves being circulated by said drive means in a common plane in closed endless tracks mounted on said frame means and wherein a portion of said closed endless tracks form a straight working section such that each pair of cooled die halves is adjacent to each other and without any spacing therebetween and forming therebetween a plurality of adjacently running form passages, said form passages have different cross-sectional dimensions;

guide means for guiding each pair of said cooled die halves along said closed endless tracks, said cooled die halves being non-transversely displaceable with respect to said guide means in said common plane of circulation;

displacement means for selectively placing one of said form passages into alignment with said extrusion nozzle by adjusting said frame means transversely to said common plane of circulation between a plurality of positions whereby deformable plastic tube emerging from said extrusion nozzle is pressed against the corresponding profiled inner wall of said form passage by a pressure gradiant being produced by said pressure gradient means and acting from the inside to the outside, said so formed tube being thereafter solidified by cooling in said form passage.

2. Apparatus according to claim 1, wherein said frame further comprises a base, a carriage, and a subframe, said carriage is displaceable and arrestable on said subframe in the traveling direction of the hollow mold relative to said extrusion nozzle and on which the two die halve pairs circulate in a horizontal plane, and said subframe is vertically displaceable on said base and is adjustable against end stops set at various levels.

3. Apparatus according to claim 2, wherein said die pairs are exchangeable and said end stops are adjustable in their height.

4. Apparatus according to any one of claims 1, 2 or 3, wherein said die halves contain two to five form passages.

5. Apparatus according to any one of claims 1, 2 or 3, further comprising a power drive for setting the positions of said guide means for said die halves.

6. Apparatus according to claim 5, wherein said power drive is coupled to said end stops for automatically moving said guide means into position in front of said extruder nozzle.

* * * * *